Figure 1:
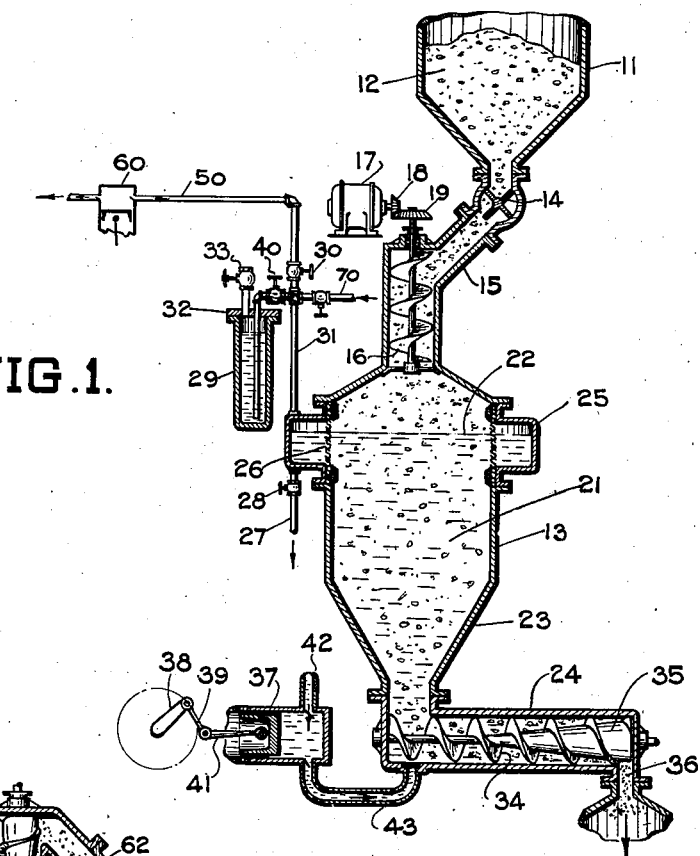

Dec. 19, 1939.  A. G. HAMILTON ET AL  2,183,837
PROCESS AND APPARATUS FOR EXTRACTION
Filed April 28, 1936  2 Sheets-Sheet 1

INVENTORS.
ALAN G. HAMILTON,
EZRA C. PERKINS,
BY
E. H. O'Brien
ATTORNEY

Dec. 19, 1939.  A. G. HAMILTON ET AL  2,183,837
PROCESS AND APPARATUS FOR EXTRACTION
Filed April 28, 1936   2 Sheets-Sheet 2

INVENTORS
ALAN G. HAMILTON,
EZRA C. PERKINS,
BY
*C. K. O'Brien*
ATTORNEY

Patented Dec. 19, 1939

2,183,837

UNITED STATES PATENT OFFICE 2,183,837

PROCESS AND APPARATUS FOR EXTRACTION

Alan G. Hamilton and Ezra Clinton Perkins, Niagara Falls, N. Y., assignors to E. I. du Pont de Nemours & Company, Wilmington, Del., a corporation of Delaware Application April 28, 1936, Serial No. 76,790

5 Claims. (Cl. 87—6)

This invention relates to a novel and improved process for extraction and to improved apparatus for carrying out that process. More particularly, it relates to the extraction of vegetable oils and various other extractable matters from materials containing these extractable matters, using for the purpose various solvents.

While our method and apparatus are useful in extraction processes, generally, they are particularly adapted for the extraction of vegetable oils, such as soya and castor oils, which are now extracted with solvents in large quantities in this country. Various other oils of vegetable origin are now obtained principally by pressing, but it is an object of our process to permit the efficient and economical extraction of these oils with various solvents. Similarly animal fats and greases, which are now largely obtained by rendering, may be satisfactorily treated by means of our extraction process. Examples of other materials with which our process is designed to operate are the fish oils, such as whale, halibut liver and codliver oil, although at present most of these oils are obtained commercially by either boiling or pressing.

Large amounts of oil derived from vegetable matters, particularly from seeds of vegetable origin, are now extracted by the use of various solvents. Among these solvents may be mentioned the chlorinated hydrocarbons such as trichlorethylene, dichlorethylene, chloroform, methylene chloride, perchlorethylene, and tetrachlorethane and various other hydrocarbon solvents such as naphtha and benzene. While in this country at present only soya bean and castor oils are obtained by solvent extraction, various other vegetable oils such as almond oil, tung oil, peanut oil, pine oil, olive oil, corn oil, rape seed oil, and linseed oil have at various times been or are now being pressed in order to extract the oil, and would probably be extracted by solvents were a suitable process available. Our process is designed to operate wherever any substance is to be extracted with a solvent in order to recover extractable matter, and we have specified various types of vegetable and animal products merely in an effort to indicate some of the applications for which our method and apparatus may be suitable.

Although our process and apparatus will be described in connection with the extraction of vegetable oils from various seeds, using a chlorinated hydrocarbon such as methylene chloride or trichlorethylene as a solvent, the process is, of course, of broad general application and the particular material selected is designed merely as an illustration. There is nothing inherently present in our invention which restricts it to the extraction of any particular type of product and we intend the invention to be of utility wherever any oleaginous or other extractable material is to be obtained by solvent extraction from the materials which contain it.

In the usual method for extracting extractable materials by means of a solvent, the solvent remaining in the solid and retained thereby after removal of the solid material from the extraction equipment is usually driven off by the application of direct heat, live steam, vacuum, or by any combination of these means. While the bulk of the solvent used is thus vaporized, any soluble material which may have been dissolved in this portion of the solvent remains behind in the solid material. Ordinarily, in batch processes in order to recover this remaining soluble material, it has been customary to subject the solid to a second extraction.

We have now developed an extraction process and certain types of apparatus for carrying that process into practical effect. By means of our process it is possible to recover a large part of the solvent remaining in the solid material without the necessity for subjecting this solid material to a process wherein this liquid is vaporized. In order to accomplish this, we subject the solid material to a pressing or squeezing action to reduce its liquid content before that solid material is removed from the extraction vessel. In a batch system of operation, this involves squeezing or pressing of the solid material between successive extractions. In the continuous system of operation, with which this invention is primarily concerned since it is of greater commercial importance, the solid material, as it is removed from the extraction vessel, is subjected to a squeezing or pressing operation. This squeezes out and removes from the solid material a large portion, in fact practically all, of the miscella or solvent containing the oil or other extractable matter. In this way, substantial savings are effected, not only by reducing the quantity of liquid which must be volatilized from the solid material, but also by recovering a greater amount of the miscella.

Our process involves various other features which are novel in the extraction of soluble materials from solids by means of various solvents. Thus we may carry out our process under a pressure which is either greater than or less than atmospheric. Pressures above atmospheric expedite or speed up the operation of filtering off the solvent containing the dissolved matter (miscella) from the solid material. When pressures less than atmospheric are employed, the extraction of the extractable material from the solid is aided. We have found especially effective pressures which vary from above atmospheric to below atmospheric and vice versa, and, as will be consequently disclosed, we employ such pressures in certain phases of our improved method. Varying or pulsating pressures expedite and facilitate the extraction of soluble material from the solid by causing an increased in-and-out flow of the solvent or miscella through the pores or interstices of the solid material. Pulsating pressures which vary from above atmospheric to below atmospheric facilitate removal of the miscella by assisting in the displacement of matted or accumulated solid material which is present on the surface of the filtering element.

Other novel features of our invention involve crushing, grinding or otherwise causing the disintegration or break-up of the solid material while this solid material is in the presence of the solvent or miscella. Preferably the solid material as it passes through the system is subjected to a succession of squeezing actions so that the solid is not only broken up but the solvent or miscella contained therein is alternatively driven off from the solid material and then taken up again by that solid. This may be accomplished by a series of mechanical rollers or other suitable devices such as a hydraulic pressing or extension means. By breaking up or crushing the solid in the presence of solvent or miscella a larger amount of extractable matter is removed by the solvent.

Other features of our invention involve soaking the solid material in the solvent or in the miscella before the solid material is ground or crushed. The use of this procedure greatly assists in the removal of extractable matter from the solid since the solvent not only softens the solid but also permits intimate contact of solvent or miscella and solid during the crushing or squeezing operation.

We have also devised a process and apparatus which permit the use of a bed of oncoming solid as a filter bed for the miscella before the latter is discharged from the extraction system. While we prefer to use a bed of unground solid as the filtering agent, our invention also contemplates the use of ground solid material. The use of this bed as a filtering surface will not dispense entirely with the necessity for other filters but it greatly reduces the load on these final filters and permits the use of a filtering surface of less area.

Other features of our invention involve treating the ground or otherwise broken up solid material either with fresh solvent or with a solvent which is rich in dissolved oil or other extracted material. This procedure involves distinct advantages as it replaces a portion of the oil in the solid material with an oil-solvent mixture. In this way an oil-solvent mixture (miscella) which is very rich in extracted material may be built up and the cost of the distillation required in order to separate the oil or other extractable material from the miscella is thereby greatly reduced.

While we have described the most pertinent and outstanding features and objects of our invention in the foregoing paragraphs, other objects of our invention will be apparent from the ensuing disclosure of a preferred method and preferred apparatus for carrying out our novel extraction process. Our process will be described with reference to drawings illustrating schematically various types of apparatus found suitable for use in our process. This apparatus is illustrated in Figures 1 to 4, which schematically represent certain devices by which our process can be rapidly and efficiently carried out. It should be remembered that this process is not restricted to these types of apparatus as the drawings are intended to be merely illustrative of suitable equipment.

Referring now to Figure 1, the numeral 11 represents a hopper in which the solid material 12 to be extracted is positioned. This solid material may, if desired, have previously been soaked in solvent or the hopper 11 may contain solvent in which the solid matter is immersed. The solid then enters the extraction apparatus proper, represented generally by the numeral 13, through a valve 14 and an inclined inlet spout 15. The valve 14 is so designed that when solid material is not being admitted it forms an effective seal against the escape of vapor or air out of the extraction apparatus proper. It is designed also to prevent escape of air or vapor while the solid material is being fed in.

The entering solid material, after flowing by gravity down the inlet spout 15, is carried into vessel 13 by means of the screw conveyor 16. This screw conveyor is driven by means of motor 17 and bevel gears 18 and 19.

When the solid material enters vessel 13 it comes into contact with the miscella in which the solid is suspended, represented generally by the numeral 21. The level of the solvent in this vessel is indicated at 22. The oil or other extractable substance is extracted in this vessel by the solvent and the solid material, either drops down, or is forced down by additional incoming material into the funnel-shaped throat 23 and outlet spout 24.

Positioned in and forming part of the body 13 is an annular member 25 which extends completely around the vessel. Also extending completely around the circumference of the vessel 13 is the screen 26 shaped as an annulus or ring. This screen, which may be built in any form suitable for filtering, permits passage of the solvent containing the extractable matter dissolved therein, but prevents passage of the solid material therethrough. The solvent containing the extracted material may be drawn off through the pipe line 27 which has valve 28 positioned therein.

As shown, the extraction vessel 13 is provided with a liquid seal 29 to which the pipe line 31 leads. This is provided so that the extraction process occurring within vessel 13 may be carried out under any desired pressure either greater than or less than atmospheric pressure. The liquid seal is also provided with a cover 32 and valve 33 so that, if desired, greater pressure may be applied to the mixture of solvent and oil within the vessel 13 than permitted by an ordinary liquid seal. Since the pressure which can be built up within the vessel 13 when utilizing an ordinary liquid seal as the outlet depends upon the character and height of liquid provided within the vessel comprising the seal, under certain circumstances it may be desirable to replace valve 33 by a release valve which will automatically release for any pre-determined pressure either greater than atmospheric or less than atmospheric. However, for ordinary purposes it will usually be possible to operate the extraction process carried out within vessel 13 at a sufficiently elevated or lowered pressure merely by replacing the liquid 29 in the liquid seal by a liquid of relatively high specific gravity such as mercury.

As shown, valve 40 is positioned in pipe line 31 so that the conduit leading to the seal 29 may be closed or opened at will. Pipe line 50, provided with valve 30, leads to a vacuum pump 60. This permits the exhausting of air and vapor from the extraction vessel 13 thereby permitting the process to be carried out under reduced pressure, as desired. Pipe line 70 may lead to a source of compressed air (not shown) so that air pressure may be built up within the extraction vessel 13. In this way pressures which are either considerably greater or considerably less than atmospheric may be employed in the extraction process, these pressures being so different from atmospheric that they could not readily be obtained solely by the use of piston pump 37 (to be subsequently described). It will be understood that vacuum pump 60 and the compressed air pipe 70 are auxiliary to the piston pump 37 and may be used only as and when desired.

As previously indicated the solid material, after the soluble extractable material has been removed by the solvent, drops down into the outlet spout 24. Here the solid is first conveyed laterally by means of the screw conveyor 34. As indicated, the outlet end of this screw conveyor is shaped to form a squeezing or pressing device. This device, which may comprise a continuation of the threads of the screw conveyor on a hub or axle of gradually increasing diameter, squeezes out from the solid material substantially all of the miscella contained therein. In thus squeezing out the solvent the extractable material dissolved in that solvent is thus also squeezed out. As the solid material is conveyed laterally along the discharge spout the miscella is expelled and the substantially dry solid is then permitted to drop down through outlet spout 36. This outlet spout may lead to another extraction vessel similar to that illustrated in Figure 1, or the solid material may be disposed of in any other desired manner.

Fresh solvent is pumped into the extraction vessel 13 by means of the reciprocating piston pump 37 which is driven through crank 38, connecting link 39, and piston rod 41. The solvent enters through pipe 42 into the pump chamber and then passes into the extraction vessel 13 through the pipe line 43. It is also apparent that this device may be utilized to build up a pressure greater than atmospheric with the extraction vessel or, if desired, it may be used to create a pressure slightly below atmospheric within the extraction vessel. If the reciprocating piston pump is continuously operating, a pulsating pressure is built up within the extraction vessel which assists in the filtration by aiding in the stripping of caked solid material from the filtering surfaces. As previously stated, pulsating pressure also assists in the removal of extractable material from the solid material being treated.

It is apparent that in the operation of the device just described several of the features indicated as comprising novel elements of our invention are present. Thus the solvent is squeezed from the solid material to a substantial degree before the latter is discharged from the apparatus. Provision is made for operation under increased pressure, under a pressure less than atmospheric and under conditions wherein the solid and miscella are subjected to pulsating or varying pressures.

Figure 2:
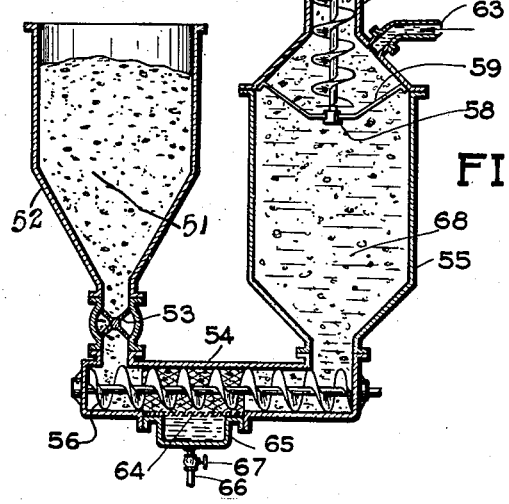

Referring now to Figure 2, a slightly different type of apparatus which is suitable for carrying out our process is illustrated. Here again the solid material 51 is positioned in hopper 52 and is fed downwardly into the extraction apparatus proper through valve 53. This valve is constructed similarly to valve 14 shown in Figure 1 and operates as a closure member which effectively seals the outlet and permits operation at pressures greater or less than atmospheric within the extraction vessel.

After passing through closure valve 53 which may be rotated to permit batches of the material to pass through it, the valve at all other times operating as a closure member or seal and being vapor-tight, the solid material flows down into the horizontal tube 54. This tube and the vessel 55 serve as the extraction vessel. Positioned within tube 54 is a screw conveyor 56 which conveys the solid material laterally into the vessel 55. In the horizontal tube and in this vessel the extraction occurs and the solid material, which is frequently lighter than the solvent, may rise upwardly within vessel 55. As increasing amounts of solid material are fed in the solid material, from which the extractable matter has been dissolved out by the action of the solvent, is conveyed upwardly by screw conveyor 57. As shown, this screw conveyor has its lower end supported on bearing 58 held in spider member 59. The upper end of this screw conveyor is formed so as to act as a pressing or squeezing member and is indicated by the numeral 61. This crusher may have the same form as the member 35 shown in Figure 1. A large part of the solvent contained in the solid material is pressed out therefrom by the action of the member 61 and the partially dry solid material is discharged downwardly through spout 62. The mixed solvent and extractable matter (miscella) thus remain within the member 55 and the amount carried out with the solid material is substantially reduced.

Fresh solvent is fed in through the inlet 63 and travels in a counter-current direction to the oncoming solid material. In the horizontal tube 54 is positioned a filter 64 which permits discharge of the miscella into the receptacle 65. From this receptacle it is drawn out to the stills provided for solvent recovery (not shown) through the pipe line 66 in which valve 67 is positioned.

It is obvious that the device illustrated in Figure 2 could be employed to carry out the process under a pressure greater than or less than atmospheric since members 63 and 61 constitute sealing closure members. The device illustrated in this figure is especially applicable when it is desired to extract extractable matter from vegetable products such as seeds which are lighter than the solvent used and which tend to float to the surface thereof. As described, the seeds or other solid being extracted rise through the miscella 68 as a result of the action of gravity to a position where they can be carried out by means of conveyor 57 to squeezing member 61. Here the miscella is squeezed out and the solid material leaves the apparatus at 62 in relatively dry condition.

Figures 3, 4:
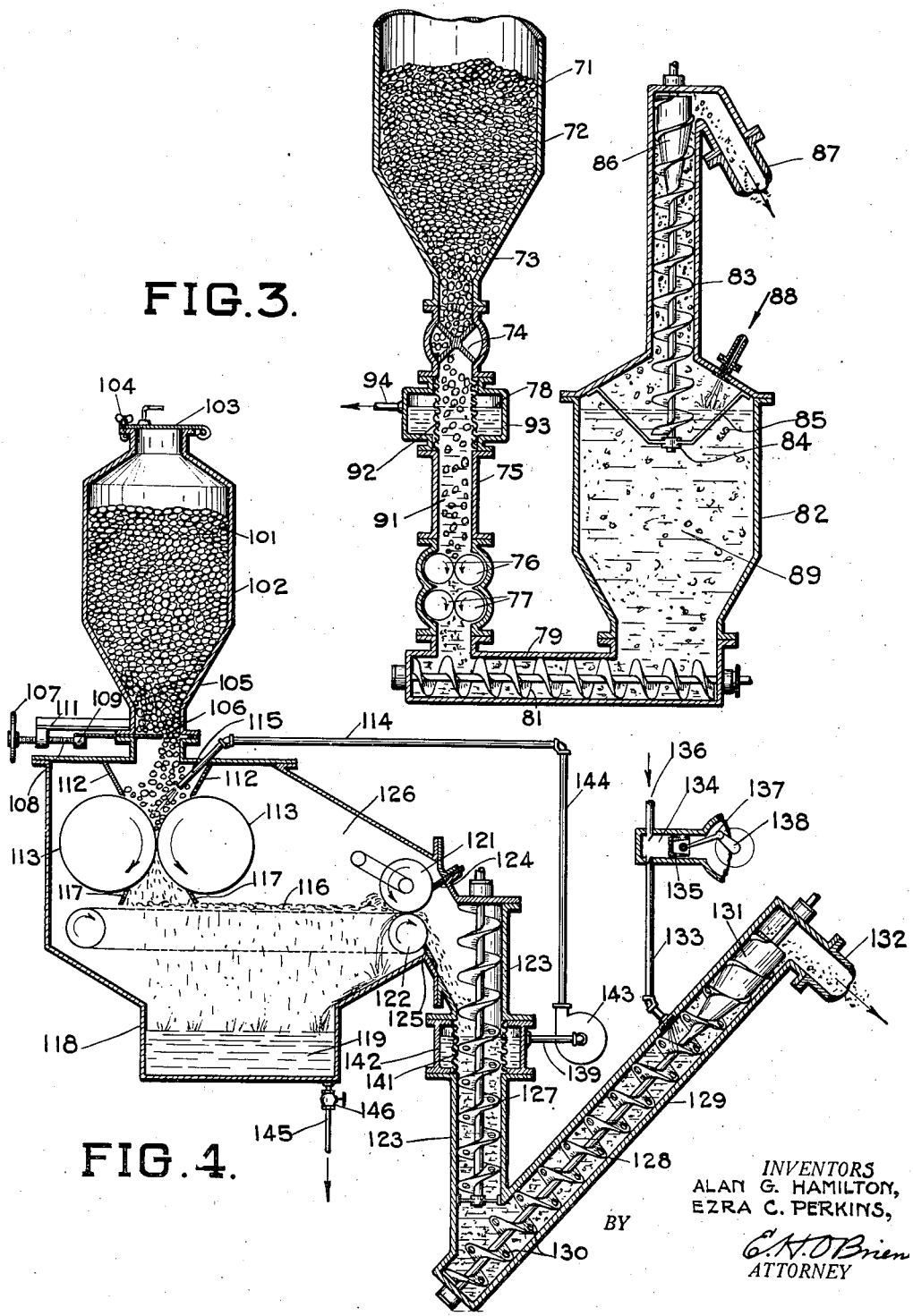

Referring now specifically to Figure 3, it will be noted that the form of apparatus here illustrated is somewhat similar to that shown in Figure 2. However, this device illustrates two further features of our invention, utilizing a bed of oncoming solid matter as a filter medium, and grinding and disintegrating the solid while it is in contact with or in the presence of miscella or solvent.

The solid material to be extracted, 71, is positioned in the hopper 72. It drops downwardly into the funnel-shaped receptacle 73 and passes through valve 74 into the extraction apparatus proper. Valve 74 is constructed as valves 14 and 53 so as to provide an airtight closure when solid material is not being introduced into the extraction apparatus, and also to prevent vapor escape when solid material is being introduced.

After entering the apparatus through valve 74 the solid material piles up in the vertical cylindrical member 75. Here the uncrushed solid material acts as a filtering bed, as will be subsequently described.

The solid material then drops down by gravity to a point where it is crushed by the two sets of crushing rollers 76 and 77. Since solvent fills up this entire space to the solvent level indicated by the line 78, it is obvious that this crushing, grinding or disintegration of the solid material occurs in the presence of the solvent containing extracted matter. The crushed solid then drops downwardly into the horizontal member 79 wherein it is conveyed laterally by the screw conveyor 81. This screw conveyor conveys the solid material into the large vessel 82 within which the solid material may either rise by gravity or may be displaced upwardly by oncoming amounts of solid material.

As the solid material travels upwardly in the vessel 82 it is removed from this vessel by means of the screw conveyor 83. As shown, this screw conveyor may be provided with a bearing 84 supported by means of a spider member 85.

Screw conveyor 83, which is substantially identical with the screw conveyor 57 shown in Figure 2, is provided at its outlet end with a squeezing or pressing device 86. This device is substantially identical with the device 61 described in Figure 2 and it presses out solvent containing the dissolved extractable material from the solid material. The crushed and pressed solid material is discharged through outlet spout 87 to some suitable receptacle. If desired, this may constitute a second extraction vessel in which the solid material is again subjected to an extraction process to dissolve out any remaining amounts of extractable material contained therein or any other means for recovering the last traces of solvent. Pipe line 88 provides an inlet for fresh solvent which travels in a counter-current direction to the direction of flow of the solid. The mixture of miscella and solid is represented generally by the numeral 89. The solvent then passes laterally through the horizontal tube 79 and upwardly within the vertical tube 75. As the miscella passes through the bed of uncrushed solid material represented by the numeral 91 the solid material suspended therein is removed therefrom by the filtering action of this bed of solid material. This filtration is not complete, however, and the miscella still containing some suspended matter is filtered by means of the annular filter 92, the clear solvent and extractable matter being permitted to flow into the annular receptacle 93. From this annular member it is drawn off through pipe line 94 to stills (not shown) wherein the extractable matter may be separated from the solvent by suitable distillation.

It is obvious that the device shown in Figure 3, which is also of a type especially adaptable for the treatment of a solid material which is lighter than the solvent and which tends to rise therein due to the force of gravity, illustrates that phase of our process involving the use of a bed of solid material, preferably uncrushed solid material, as a filtering surface. It also involves crushing or disintegrating the solid in the presence of the miscella in order to extract therefrom additional amounts of extractable material. It also illustrates the step of squeezing out from the solid material before permitting the latter to leave the apparatus a substantial portion of the miscella contained therein. Of course, the process of extraction carried out therein may be carried out at a pressure other than atmospheric pressure since members 74 and 86 provide effective seals. Inlet line 88 might be connected with some sort of device providing for pulsating pressure, such as that shown by the numerals 37, 38, 39, 41 and 42 in Figure 1, so that a pulsating pressure might be employed for the purpose of aiding in the filtration through filter 92 or assisting in the extraction of additional quantities of extractable matter from the solid.

In Figure 4 representing still another form which our apparatus employing novel principles constituting an improved process in the extraction of extractable material from solid materials by the use of solvents may assume, the numeral 101 represents a solid material from which the extractable matter is to be extracted. The solid is retained in the hopper 102 which is provided with a closure member 103. This closure member may be provided with a securement means represented generally by the numeral 104 so that considerable pressure may be built up within vessel 102 without air or other gas escaping through closure 103.

Solid materials drop downwardly through the funnel-shaped portion of member 102 which is designated by numeral 105, and then into the extraction apparatus proper. This extraction apparatus is closed with a valve 106 which may be operated by means of the rotary operating member 107. As shown, the member 107 is provided with a screw threaded portion 108 on which a follower member 109 travels. As the rotary member 107 is rotated in frame 111 the valve 106 may be opened or closed. This member is designed so that it may provide an air-tight seal so that pressure may be built up within the apparatus which it closes.

The solid material then drops downwardly into the space within the guide members 112 where it is crushed by the crushing rolls 113. As the material is being crushed it is wet with miscella brought into the pipe line 114 and discharged through the nozzle 115. As will be hereinafter described this miscella is solvent which contains dissolved therein substantial amounts of matter extracted from preceding amounts of the solid by previous extraction operations.

The crushed solid material then drops downwardly to the screen belt 116, its path being guided by means of guide members 117. Belt 116 is constructed so as to constitute a travelling filter. The solid material is retained on this belt and the solvent containing dissolved extractable matter drops through this belt into the sump 118 where it collects in the pool represented by the numeral 119.

The solid material is conveyed along the traveling filter belt until it comes into contact with roll 121 which bears against end roll 122 of the conveyor. Between the two rolls the solid material is pressed, the solvent with dissolved extractable matter being sent back into the sump 118 to form part of the body of liquid 119 and the solid material, in a partially dry state, being permitted to drop into the outlet tube 123. The rolls 121 and 122 are analogous to the squeezing members shown on the other drawings and represented by numerals 35, 61 and 86. They press out from the solid material the greater portion of the solvent or miscella, permitting only partially dry solid to be discharged from the apparatus.

In order that no solid material may be carried back by the rolls 121 and 122, scraper members 124 and 125 are provided. These members press securely against the rollers 121 and 122.

In the discharge tube 123 is positioned a screw conveyor 127. The solid material is conveyed downwardly by this screw conveyor against the action of the oncoming stream of solvent to a position where it may be conveyed upwardly by means of screw conveyor 128 which is positioned in cylindrical member 129. In cylinder 129 the crushed solid material and the solvent are brought into intimate contact. The upper portion of screw conveyor 128 is provided with a squeezing or pressing member 131 which is constructed similarly to members 35, 61 and 86 previously described. This member serves to press out from the solid material substantially all retained solvent and dissolved extractable matter so that the substantially solid material, partially freed from liquid, is discharged downwardly through the discharge spout 132.

As shown, fresh solvent flows into the apparatus through inlet pipe 133 from the chamber 134 of the reciprocating piston pump 135. Pipe line 136 is the inlet pipe through which the solvent flows into the pump chamber. Reciprocating piston pump 135 is driven by means of piston rod 137 and crank 138.

The fresh solvent flows into the interior of cylindrical member 129 and downwardly against the stream of solid material which is conveyed upwardly by means of the screw conveyor. It then travels upwardly through the vertical cylinder member 123 and is carried out through the outlet pipe 139. Before passing through the outlet pipe the resulting miscella is filtered through the annular filtering surface 141 into an annular member surrounding cylinder 123 which is represented generally by numeral 142.

After flowing out through pipe line 139 the miscella pumped by the centrifugal pump 143 through pipe lines 144 and 114 and into contact with the crushed oncoming stream of solid, which is being crushed by the rolls 113, through the discharge nozzle 115. In this way solvent which has already extracted extractable matter from the solid within the cylindrical members 123 and 129 is used to wash the oncoming solid material crushed for the first time by rollers 113.

From sump 118 a portion of miscella 119 is drawn off from time to time through the outlet pipe 145 which is controlled by valve 146. As shown, this solvent containing large amounts of dissolved extractable matter is carried to solvent recovery stills (not shown) where, the extracted material is stripped from the solvent by suitable distillation. The purified solvent can, of course, be returned by pipe line 136 to be used over and over again.

The process carried out in the apparatus illustrated in Figure 4 involves several of the novel features of our invention. Thus, it involves crushing the solid material in the presence of either pure solvent or in the presence of miscella containing considerable amounts of extracted material dissolved therein. Second, it involves the use of the oncoming bed of solid material, which in this embodiment of the invention is positioned within the vertical cylinder member 123, as a preliminary filtering bed. It also involves operation of the reciprocating pump 135 so as to build up an increased pressure greater than atmospheric within the system or to bring about a pressure less than atmospheric within the system. If the reciprocating piston pump 135 is constantly operated a pulsating or reciprocating pressure results within the entire apparatus which not only assists in the extraction of additional quantities of extractable material but which also helps to keep the filtering surfaces 141 and 116 substantially free of adhering solid material. Finally the process involves squeezing out from the solid material a substantial portion of the retained solvent and dissolved matter before it is discharged from contact with the body of miscella. As shown, two specific types of mechanism are represented, designated by numerals 121 and 122, and by numeral 131 for carrying out this pressing or squeezing operation. If desired, the process carried out in the apparatus of Figure 4 may occur under a pressure greater than atmospheric built up by the reciprocating pump 135 or otherwise, for the closure members 103, 106 and 131 provide effective seals against the escape of gases or vapor. Our process also contemplates the operation of pump 135 so as to obtain a pulsating or varying pressure within the entire system, comprising elements 129, 123 and 126, preferably a pressure which varies from above atmospheric to below atmospheric and vice versa, thereby assisting in the filtering operation and aiding the extraction of extractable matter from the solid material being treated.

As shown in Figure 4, apertures 130 may be provided in screw conveyor 128 in order to permit the ready movement of solvent or miscella through the apparatus. Similar apertures may be provided in any other screw conveyors shown, if there is not sufficient clearance between the screw flights and the casing to permit the movement of solvent or miscella. Other means may be provided to accomplish the same purpose, i. e. the free movement of liquid in a direction counter-current to that of the solid, such as providing fluting or notches on the edges of the conveyor flights.

It is to be understood that various changes might be made in both the process and apparatus described which would still be within the scope of our invention. The invention is not to be restricted to details which have been given merely as illustrative of the process and apparatus, but its scope is to be interpreted in the light of the annexed claims.

We claim:

1. A continuous process for extracting extractable material from solids wherein a solvent for said extractable material flows counter-current to the direction of travel of said solids through said solvent, which comprises continuously passing said solid through a counter-current stream of said solvent under conditions wherein extraction is carried out under pulsating pressures.

2. A continuous process for extracting extractable material from solids wherein a solvent for said extractable material flows counter-current to the direction of travel of said solids through said solvent, which comprises continuously passing said solid through a counter-current stream of said solvent under conditions wherein extraction is carried out under a pressure which is periodically varied above and below atmospheric pressure.

3. A continuous process of extracting extractable material from solids wherein said solids travel counter-current to the flow of solvent for said extractable material which comprises subjecting a solid to the action of a solvent for said extractable material under conditions wherein the pressure varies periodically during the extraction process, disintegrating said solid material in the presence of said solvent, filtering the resulting miscella through an oncoming bed of the said solid material and squeezing said solid material substantially dry before discharging said solid from the extraction apparatus.

4. Apparatus for continuously extracting extractable material from a solid material by means of a solvent for said extractable material which comprises, in combination, an extraction vessel, means for conveying said solid material to said extraction vessel, means for filtering off the resulting miscella, means for discharging said solid material from said extraction vessel, and means by which the pressure within said extraction vessel may be varied periodically during the course of extraction.

5. Apparatus for continuously extracting extractable material from solids by means of a solvent for said extractable material which comprises, in combination, an extraction vessel, means for passing said solids through a counter-current stream of said solvent in said vessel, and means for periodically varying the pressure within said vessel during the course of extraction.

ALAN G. HAMILTON.
EZRA CLINTON PERKINS.